United States Patent
Aghtar

(10) Patent No.: US 11,064,446 B2
(45) Date of Patent: Jul. 13, 2021

(54) APPARATUS AND METHODS FOR WIDEBAND RECEIVERS

(71) Applicant: ANALOG DEVICES, INC., Norwood, MA (US)

(72) Inventor: Saeed Aghtar, Hillsborough, NJ (US)

(73) Assignee: Anatog Devices, Inc., Norwood, MA (US)

( * ) Notice: Subject to any disclaimer, the term of this patent is extended or adjusted under 35 U.S.C. 154(b) by 588 days.

(21) Appl. No.: 15/139,212

(22) Filed: Apr. 26, 2016

(65) Prior Publication Data

US 2017/0310520 A1    Oct. 26, 2017

(51) Int. Cl.
*H04W 56/00*      (2009.01)
*H04B 7/08*       (2006.01)
*H04B 1/00*       (2006.01)
*H04L 27/00*      (2006.01)

(52) U.S. Cl.
CPC ........ *H04W 56/001* (2013.01); *H04B 1/0053* (2013.01); *H04B 1/0082* (2013.01); *H04B 7/0817* (2013.01); *H04L 27/0014* (2013.01); *H04L 2027/0051* (2013.01); *H04L 2027/0055* (2013.01)

(58) Field of Classification Search
CPC combination set(s) only.
See application file for complete search history.

(56) References Cited

U.S. PATENT DOCUMENTS

| 7,062,001 B2 | 6/2006 | Lee |
| 8,068,799 B1 | 11/2011 | Prestwich et al. |
| 8,457,620 B2 * | 6/2013 | Jin .......................... H04W 8/22 455/418 |

(Continued)

FOREIGN PATENT DOCUMENTS

EP       2403145 A1    1/2012

OTHER PUBLICATIONS

Lesellier, Study of multichannel wideband receiver architectures, Feb. 2014, University of Paris—Est, 2013.*

(Continued)

*Primary Examiner* — Wednel Cadeau
(74) *Attorney, Agent, or Firm* — Knobbe, Martens, Olson & Bear, LLP

(57) ABSTRACT

Provided herein are apparatus and methods for wideband receivers. In certain configurations, a radio frequency (RF) communication system includes two or more receiver slices that operate in parallel with one another to process an RF input signal. The receiver slices generate digital signals by processing different sub-bands of the RF input signal. For example, the RF communication system can include a first receiver slice that processes a first sub-band of the RF input signal and that generates a first digital signal representing the first sub-band, and a second receiver slice that processes a second sub-band of the RF input signal and generates a second digital signal representing the second sub-band. The RF communication system further includes a clock generation circuit that generates one or more clock signals to control timing of the receiver slices, and a sub-band processing circuit that processes the digital signals from the receiver slices.

20 Claims, 11 Drawing Sheets

(56) References Cited

U.S. PATENT DOCUMENTS

| | | | |
|---|---|---|---|
| 8,805,297 B2* | 8/2014 | Hanevich | H04B 1/001 |
| | | | 455/73 |
| 2003/0058148 A1 | 3/2003 | Sheen | |
| 2003/0171100 A1* | 9/2003 | Petersson | H03M 1/1255 |
| | | | 455/141 |
| 2004/0172148 A1* | 9/2004 | Horibe | G11B 20/10009 |
| | | | 700/94 |
| 2011/0306300 A1* | 12/2011 | Behera | H03D 7/165 |
| | | | 455/47 |
| 2012/0127009 A1* | 5/2012 | Pagnanelli | H03M 3/468 |
| | | | 341/143 |
| 2012/0206285 A1 | 8/2012 | Khlat | |
| 2013/0170840 A1* | 7/2013 | Chang | H04B 10/25754 |
| | | | 398/115 |

OTHER PUBLICATIONS

Lesellier, Study of multichannel wideband receiver architectures, Feb. 2014, University of Paris—Est. (Year: 2013).*

Gupta et al., "Digital Channelizing Radio Frequency Receiver" IEEE Transactions on Applied Superconductivity, vol. 17, No. 2, Jun. 2007, 8 pages.

Lee, Cheol-Woong, "A Low Voltage, Parallel Path Wideband RF Receiver", retrieved from http://www.eecs.berkeley.edu/XRG/Summary/Old.summaries/01abstracts/cwlee.1.html on Mar. 9, 2016, 2 pages.

Lesellier, A., "Study of Multi-Channel Wideband Receiver Architectures" Universite Paris—Est, 2013, 111 pages.

Oct. 8, 2019 Chinese Office Action from related CN App. No. 201710281506.8 (9 pgs).

* cited by examiner

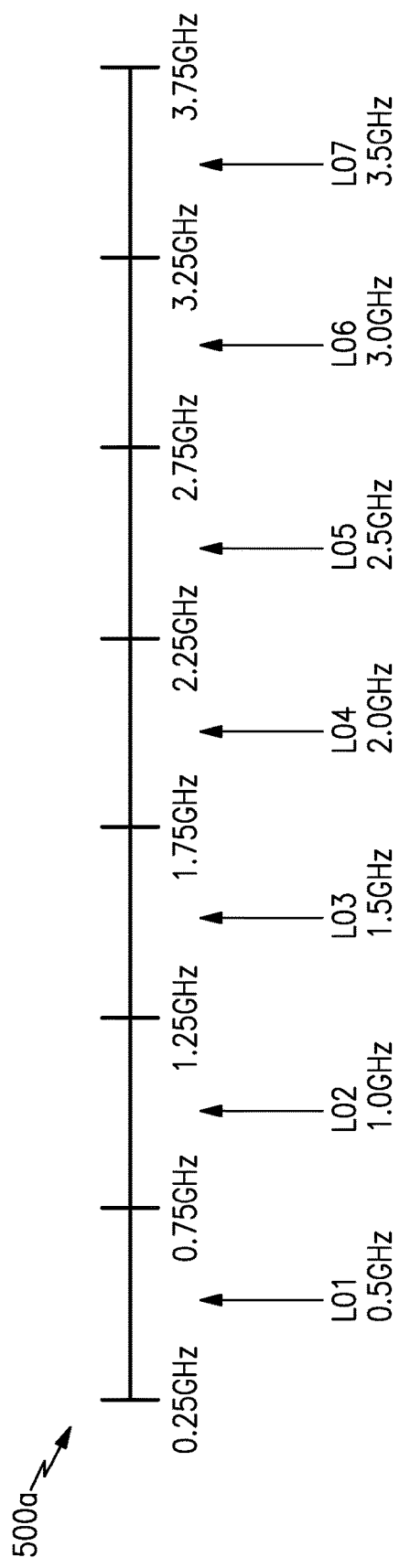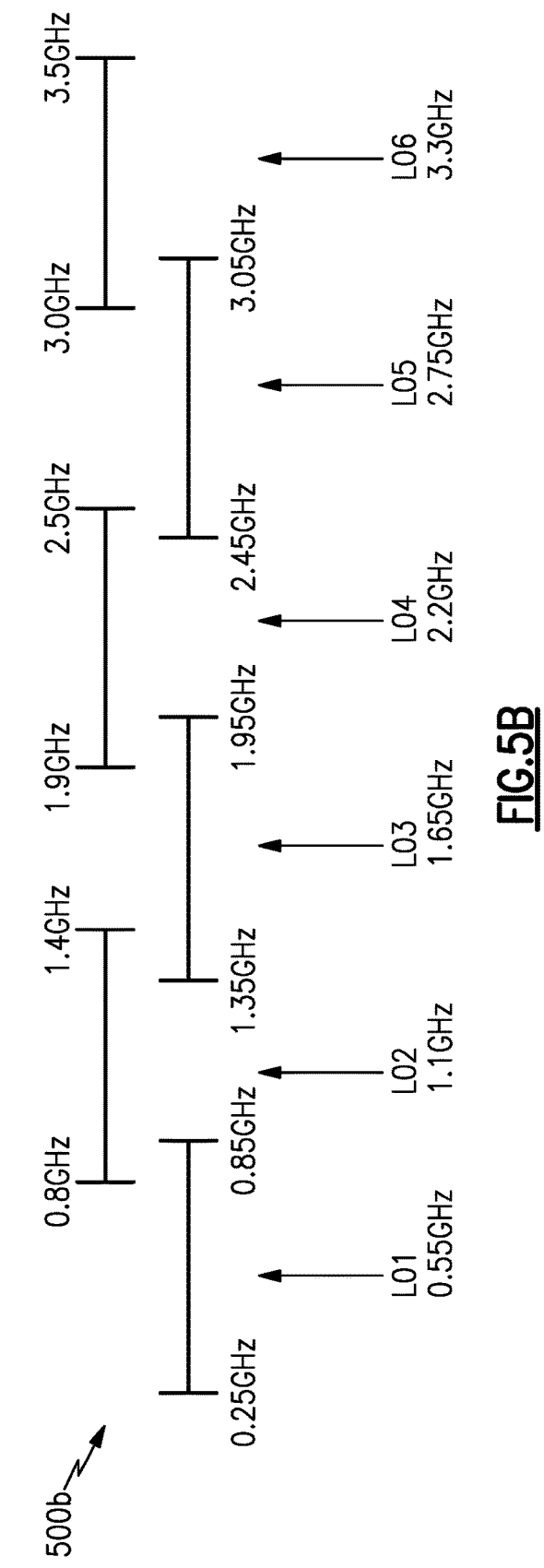

US 11,064,446 B2

APPARATUS AND METHODS FOR WIDEBAND RECEIVERS

BACKGROUND

Field

Embodiments of the invention relate to electronic systems, and more particularly, to radio frequency (RF) electronics.

Description of the Related Technology

Radio frequency (RF) receivers are used in a variety of applications. For example, RF receivers can be included in mobile devices and base stations to receive signals associated with a wide variety of communications standards, including, for example, cellular standards and/or wireless local area network (WLAN) standards.

SUMMARY

In one aspect, a radio frequency (RF) communication system is provided. The RF communication system includes two or more receiver slices configured to operate in parallel with one another to process an RF input signal, a clock generation circuit configured to generate one or more clock signals configured to control timing of the two or more receiver slices, and a sub-band processing circuit configured to process a plurality of digital signals generated by the two or more receiver slices. The two or more receiver slices include a first receiver slice configured to process a first sub-band of the RF input signal and to generate a first digital signal representing the first sub-band, and a second receiver slice configured to process a second sub-band of the RF input signal and to generate a second digital signal representing the second sub-band. The first sub-band and the second sub-band are at least partially non-overlapping in frequency, and the digital signals include the first digital signal and the second digital signal.

In another aspect, a method of RF communication is provided. The method includes receiving an RF input signal that includes a plurality of sub-bands as an input to a receiver that includes two or more receiver slices. The method further includes processing a different one of the plurality of sub-bands using each of the two or more receiver slices, generating a plurality of digital signals representing the plurality of sub-bands using the two or more receiver slices, generating one or more clock signals that control timing of the two or more receiver slices using a clock generation circuit of the receiver, and processing the plurality of digital signals using a sub-band processing circuit of the receiver.

In another aspect, a satellite communications box is provided. The satellite communications box includes a wideband receiver and a temperature sensor configured to detect a temperature of the satellite communications box. The wideband receiver includes two or more receiver slices configured to operate in parallel with one another to process an RF input signal received from a satellite. The two or more receiver slices are configured to generate a plurality of digital signals representing a plurality of sub-bands of the RF input signal. The wideband receiver further includes a clock generation circuit configured to generate one or more clock signals that control timing of the two or more receiver slices, and a sub-band processing circuit configured to process the plurality of digital signals generated by the two or more receiver slices. The two or more receiver slices are individually enablable, and a number of enabled receiver slices of the two or more receiver slices is based on the detected temperature.

BRIEF DESCRIPTION OF THE DRAWINGS

These drawings and the associated description herein are provided to illustrate specific embodiments of the invention and are not intended to be limiting.

FIG. 5A is a schematic diagram of sub-band bandwidth and local oscillator (LO) frequencies for one implementation of a wideband receiver.

FIG. 5B is a schematic diagram of sub-band bandwidth and LO frequencies for another implementation of a wideband receiver.

DETAILED DESCRIPTION OF EMBODIMENTS

Figure 1:
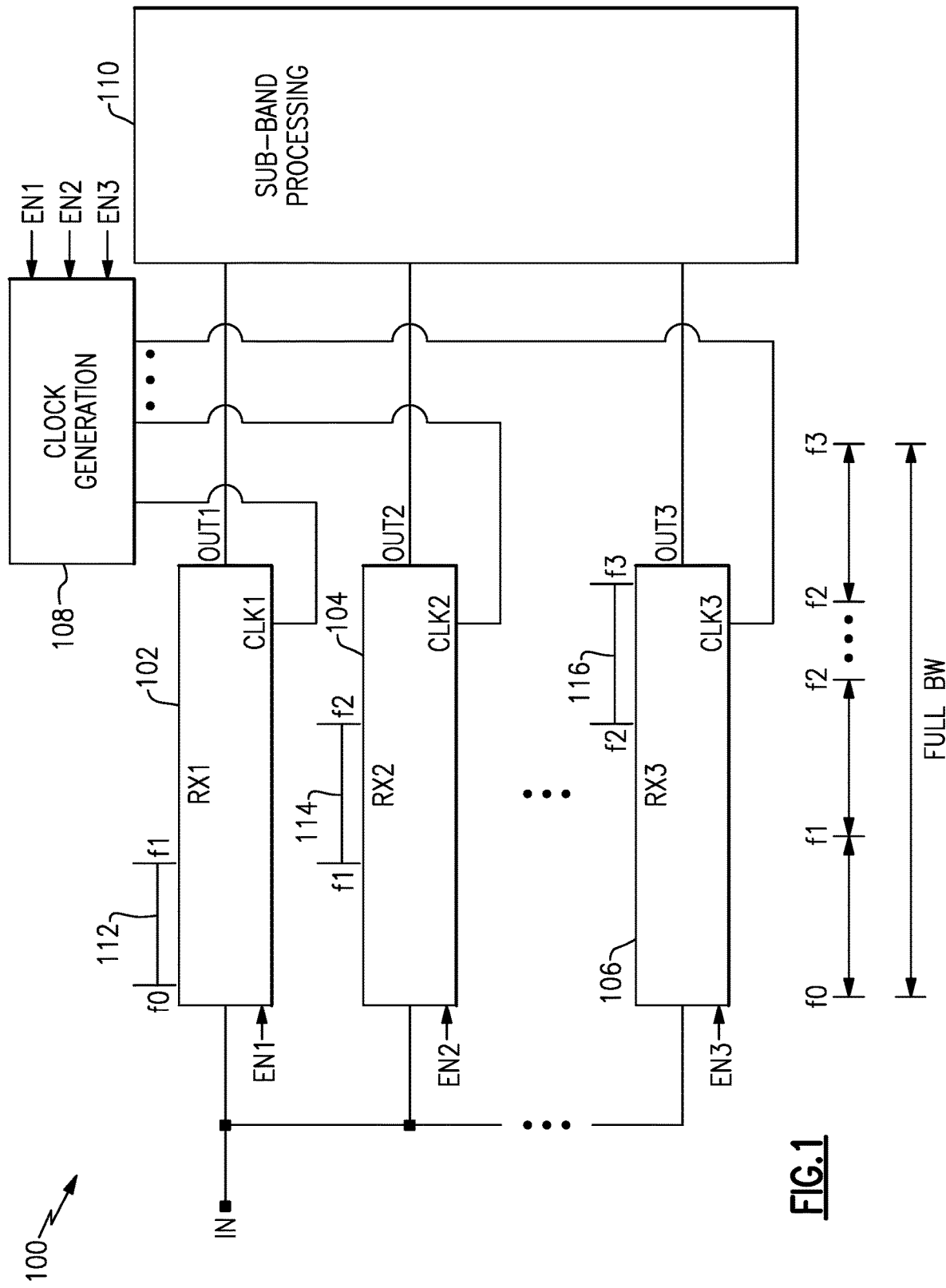
FIG. 1 is a schematic diagram of a wideband receiver according to one embodiment.

The following detailed description of embodiments presents various descriptions of specific embodiments of the invention. However, the invention can be embodied in a multitude of different ways as defined and covered by the claims. In this description, reference is made to the drawings in which like reference numerals may indicate identical or functionally similar elements.

There is a need for a wideband receiver to accommodate the rising demand for higher data throughput. Furthermore, there is a need for a wideband receiver having configurable bandwidth versus power consumption, and that can selectively digitize sub-bands while providing channel selection and/or spectrum stitching in the digital domain. Existing receiver architectures are unsuitable to meet such needs.

For example, one type of receiver architecture is a direct sampling receiver, which includes an analog signal conditioner that conditions an RF signal and an analog-to-digital converter (ADC) that digitizes the conditioned RF signal for further digital processing. The analog signal conditioner can provide amplification and filtering that can relax the ADC's dynamic range specification and/or provide anti-aliasing functions. A direct sampling receiver omits analog mixers for down-converting the RF signal, and thus can exhibit certain benefits in terms of size and/or cost. Moreover, a direct sampling receiver provides a high level of flexibility for channel selection in the digital domain where all or part of the available analog signal bandwidth can be digitally selected and processed.

However, a direct sampling receiver can be ill-suited for processing a wideband signal. For example, using such a receiver to process a relatively narrow signal bandwidth and/or a frequency channel located at a relatively high frequency can increase cost, complexity, and/or power consumption of the analog signal conditioner and/or ADC. In one example, an analog signal conditioner includes costly wide bandwidth filters and amplifiers to accommodate the wideband signal, and an expensive high speed/high power ADC digitizes the conditioned wideband signal.

Furthermore, a direct sampling receiver converts a full channel bandwidth from the analog domain to the digital domain. Thus, a direct sampling receiver operates at an increased power level dictated by high frequency channels regardless of location in frequency of the desired signal. For example, in some applications, a desired signal can occupy a portion of the complete band.

Another type of receiver architecture is a down conversion receiver, which includes a low noise amplifier (LNA), a local oscillator (LO), a filter, and an analog-to-digital converter (ADC). The LNA provides amplification to a received RF signal, and the LO down-converts the amplified RF signal to baseband or to an intermediate frequency. Additionally, the down-converted signal is filtered by the filter, and converted by the ADC into a digital format suitable for subsequent processing. Down conversion receivers include both super-heterodyne and direct conversion architectures. A down conversion receiver can provide lower power consumption when a bandwidth of a desired channel is smaller than the frequency at which the channel is located. For example, the power consumption associated with filtering and/or ADC sampling can decrease when the desired signal occupies a fraction of the complete band.

However, as bandwidth increases, the bandwidth of the down conversion receiver's filter and ADC also increase. Thus, a down conversion receiver also operates using high sampling rates, wide bandwidth components, and/or poor power performance when processing wideband signals. Thus, a down conversion receiver can even be less suitable than a direct sampling receiver for processing wide bandwidth signals.

Accordingly, there is a need for a wideband receiver capable of efficiently processing wideband signals, and which provides flexibility in trading off power consumption as a function of operating bandwidth.

Apparatus and methods for wideband receivers are provided herein. In certain configurations, an RF communication system includes two or more receiver slices that operate in parallel with one another to process an RF input signal. The two or more receiver slices generate digital signals by processing different sub-bands of the RF input signal. For example, the RF communication system can include a first receiver slice that processes a first sub-band of the RF input signal and that generates a first digital signal representing the first sub-band, and a second receiver slice that processes a second sub-band of the RF input signal and generates a second digital signal representing the second sub-band. The RF communication system further includes a clock generation circuit that generates one or more clock signals to control timing of the receiver slices, and a sub-band processing circuit that processes the digital signals from the receiver slices.

The teachings herein provide a receiver that can process a wide bandwidth signal, while maintaining flexibility to selectively lower power consumption when operating using a fraction of the receiver's full bandwidth. For example, the receiver's total bandwidth is divided into sub-bands that are processed using separate receiver slices, and thus one or more receiver slices and associated clock signals can be selectively disabled to decrease power consumption.

Thus, the wideband receivers herein provide a configurable trade-off between bandwidth and power consumption. For instance, when the receiver is receiving data over only a portion of the receiver's full bandwidth, one or more receiver slices can be disabled to conserve power and reduce heat dissipation. However, when wide bandwidth reception is desired, the receiver can operate with most or all receiver slices enabled. By selecting a number of active receiver slices, a desired trade-off between bandwidth and power consumption can be achieved. By providing a wideband receiver that can be controlled in this manner, the receiver can be used in a variety of applications and/or operating environments associated with different bandwidth versus power consumption specifications.

The receiver slices can be implemented in a wide variety of ways. In one example, each receiver slice is implemented using a down conversion architecture, and the clock generation circuit generates local oscillator signals of different frequencies to aid the receiver slices in processing sub-bands of desired frequencies. In certain implementations, the down conversion receiver slices are implemented as quadrature receiver circuits that separately process in-phase (I) and quadrature-phase (Q) signal components. In another example, each receiver slice is implemented using bandpass ADCs that provide analog-to-digital conversion of different sub-bands of the receive band. Although various example implementations of the receiver slices have been described, the receiver slices herein can be implemented in a wide variety of ways.

The wideband receivers herein operate with a receive band that is divided into sub-bands. The sub-bands can be abutting in frequency or partially overlapping in frequency, and the receiver slices generate digital signals representing signal content of the sub-bands. The sub-band processing circuit processes the digital signals, and can be used to provide channel selection functions and/or spectrum stitching to digitally reconstruct a signal of desired frequency content. The sub-band processing circuit can also be implemented to provide calibration and/or tuning operations.

The clock generation circuit generates one or more clock signals that control timing of the receiver slices. For example, the clock generation circuit can be used to generate local oscillator signals that control down conversion operations of the receiver slices. In certain implementations, at least a portion of the local oscillator signals can be integer multiples one of another, thereby allowing the clock signals to be generated using a common phase-locked loop (PLL) and integer dividers. In another example, the clock generation circuit generates an ADC clock signal used to control timing of data conversion operations of the receiver slices. In certain implementations, an ADC clock signal and at least one local oscillator signal are generated using a common PLL.

In certain implementations, the wideband receiver is implemented to compensate for frequency folding arising from local oscillator harmonics. For example, odd harmonics of a local oscillator signal used for mixing in a receiver slice can result in down conversion of signal content from higher frequency bands to lower frequency bands. Absent compensation, the frequency folding can degrade signal quality at low frequencies.

In one example, frequency folding is compensated by implementing one or more receiver slices using harmonic rejection mixers. In another example, the sub-band processing circuit is used to digitally compensate for frequency folding. For example, a digital signal representing a particular frequency sub-band can be compensated by digitally subtracting weighted representations of signal content at odd harmonics of the sub-band. The coefficients in the weighted subtraction can be determined in a variety of ways, such as by calibrating the wideband receiver using a known calibration signal.

The wideband receivers described herein can be used to receive signals in a wide range of applications, including, for example, broadband satellite communications, media over coax, cellular, microwave, very small aperture terminal (VSAT), test equipment, and/or sensor applications. The wide receivers can be used to process signals of a variety of frequencies, including not only those used for cellular communications, but also to higher frequencies, such as those in the X band (about 7 GHz to 12 GHz), the $K_u$ band (about 12 GHz to 18 GHz), the K band (about 18 GHz to 27 GHz), the $K_a$ band (about 27 GHz to 40 GHz), the V band (about 40 GHz to 75 GHz), and/or the W band (about 75 GHz to 110 GHz). Accordingly, the teachings herein are applicable to a wide variety of RF systems, including microwave communication systems.

The wideband receiver can be integrated with a transmitter to provide a communication system that can both transmit and receive signals. For example, in certain configurations, the wideband receiver is integrated with a wideband transmitter to operate as a wideband transceiver. Such a communication system can be used to transmit and receive wideband signals in a variety of applications.

FIG. 1 is a schematic diagram of a wideband receiver 100 according to one embodiment. The illustrated wideband receiver 100 includes a first receiver slice 102, a second receiver slice 104, a third receiver slice 106, a clock generation circuit 108, and a sub-band processing circuit 110.

Although illustrated as including three receiver slices, the wideband receiver 100 can include more or fewer receiver slices. For example, the teachings herein are applicable to wideband receivers including two receiver slices, three receiver slices, or four or more receiver slices.

The wideband receiver 100 can be used for receiving RF signals using a variety of communication standards, including, for example, Global System for Mobile Communications (GSM), Code Division Multiple Access (CDMA), wideband CDMA (W-CDMA), Long Term Evolution (LTE), 3G, 3GPP, 4G, and/or Enhanced Data Rates for GSM Evolution (EDGE), as well as other proprietary and non-proprietary communications standards.

As shown in FIG. 1, the receiver slices each receive the RF input signal IN, via a parallel input connection. The RF input signal IN can be provided to the receiver slices using single-ended or differential signaling. In certain implementations, the RF input signal IN can be buffered or amplified for distribution to the receiver slices.

The RF input signal IN is a wideband signal having a total or full bandwidth that is partitioned into sub-bands that are separately processed by different receiver slices of the wideband receiver 100.

In the illustrated example, the full bandwidth (FULL BW) of the RF input signal IN spans a frequency ranging from f0 to f3. Additionally, a first sub-band 112 spans a frequency ranging from f0 to f1, a second sub-band 114 spans a frequency ranging from f1 to f2, and a third sub-band 116 spans a frequency ranging from f2 to f3. As shown in FIG. 1, the first sub-band 112 is processed by the first receiver slice 102, the second sub-band 114 is processed by the second receiver slice 104, and the third sub-band 116 is processed by the third receiver slice 106. Accordingly, the total receive band is divided into sub-bands that are separately processed by the receiver slices 102, 104, and 106.

Although the illustrated embodiment partitions the full bandwidth of the RF input signal IN into three sub-bands, an input signal's full bandwidth can be partitioned into more or fewer sub-bands. In certain configurations, a wideband receiver includes two or more receiver slices, and the full bandwidth of the input signal is partitioned into a corresponding number of sub-bands.

In one embodiment, the full bandwidth of RF input signal IN spans a frequency range with a starting frequency in the range of about 300 MHz and an ending frequency in the range of about 4 GHz. In one embodiment, RF input signal IN is partitioned into between about 2 sub-bands and 10 about sub-bands that are processed using separate receiver slices.

Although the sub-bands 112, 114, and 116 are illustrated as abutting in frequency, the sub-bands 112, 114, and 116 can also be selected to be partially overlapping. Providing frequency overlap between sub-bands provides margin in covering the full receive band. In one embodiment, adjacent sub-bands have been about 10 MHz and about 100 MHz of overlap.

As shown in FIG. 1, the first receiver slice 102 processes the input signal's spectrum in the first sub-band 112 to generate a first digital output signal OUT1 representing signal content for frequencies spanning from f0 to f1. Additionally, the second receiver slice 104 processes the input signal's spectrum in the second sub-band 114 to generate a second digital output signal OUT2 representing signal content for frequencies spanning from f1 to f2. Furthermore, the third receiver slice 106 processes the input signal's spectrum in the third sub-band 116 to generate a third digital output signal OUT3 representing signal content for frequencies spanning from f2 to f3.

The clock generation circuit 108 generates clock signals that control timing of the receiver slices 102, 104, and 106. In the illustrated embodiment, the clock generation circuit 108 provides a first clock signal CLK1 to the first receiver slice 102, a second clock signal CLK2 to the second receiver slice 104, and a third clock signal CLK3 to the third receiver slice 106. The clock signals CLK1, CLK2, and CLK3 can be used for a variety of purposes in the receiver slices, including, for example, as local oscillator signals for mixers and/or as clocks for controlling data conversion operations of analog-to-digital converters.

In certain configurations, the frequency of each clock signal can be a function of the sub-band content. In one example, the first clock signal CLK1 is a low frequency local oscillator signal used to down-convert the first sub-band 112 to baseband, the second clock signal CLK2 is an intermediate frequency local oscillator signal used to down-convert the second sub-band 114 to baseband, and the third clock signal CLK3 is a high frequency local oscillator signal used to down-convert the third sub-band 116 to baseband.

The illustrated wideband receiver 100 has a configurable bandwidth versus power consumption profile. In particular, the receiver slices 102, 104, and 106 can be individually enabled or disabled to control a trade-off between bandwidth and power consumption.

In a first example, the first receiver slice 102 can be enabled to process the first sub-band 112 of the RF input signal IN, while the second receiver slice 104 and third receiver slice 106 can be disabled to conserve power and reduce heat dissipation. In a second example, the second receiver slice 104 can be enabled to process the second sub-band 114, while the first receiver slice 102 and third receiver slice 106 can be disabled. In a third example, the first receiver slice 102 and the third receiver slice 106 can be enabled to process the first and third sub-bands 112 and 116, while the second receiver slice 104 is disabled. In a fourth example, the first, second, and third receiver slices 102, 104, 106 are enabled to provide wide bandwidth.

The receiver slices of the wideband receiver 100 can be dynamically enabled or disabled over time to obtain a bandwidth versus power consumption performance desired at a particular time. The selection of active receiver slices can vary based on a variety of factors, such as battery charge level in mobile applications, a quality of a communication link, and/or detected temperature.

As shown in FIG. 1, the first receiver slice 102 receives a first enable signal EN1, the second receiver slice 104 receives a second enable signal EN2, and the third receiver slice 106 receives a third enable signal EN3. In one embodiment, the wideband receiver 100 is integrated on a semiconductor die or chip, and the selection of active receiver slices is selected based on control data received over pins of the chip, such as control data received via a serial interface. For example, the enable signals EN1-EN3 can be received over pins of the chip or the enable signals EN1-EN3 can be generated by an on-chip control circuit based on data received over the chip's pins.

Thus, when the wideband receiver 100 is receiving data over only a portion of the receiver's full bandwidth, one or more receiver slices can be disabled to conserve power and reduce heat dissipation. However, the wideband receiver 100 can also operate with several receiver slices enabled to increase bandwidth of receptions. By selecting a number of active receiver slices, a desired trade-off between bandwidth and power consumption can be achieved. By providing a receiver that can be controlled in this manner, the receiver can be used in a variety of applications and/or operating environments associated with different bandwidth versus power consumption specifications.

In certain implementations, when a particular receiver slice is disabled, one or more clock signals provided to the receiver slice from the clock generation circuit 108 are also disabled, thereby reducing dynamic power dissipation associated with clocking. As shown in FIG. 1, the clock generation circuit 108 receives the enable signals EN1-EN3, which are processed to selective disable one or more of the clock signals.

The sub-band processing circuit 110 receives the first, second, and third digital output signals OUT1, OUT2, and OUT3 from the receiver slices 102, 104, and 106, respectively. The sub-band processing circuit 110 processes the digital output signals OUT1, OUT2, and OUT3 to recover a desired potion of the RF input signal IN. The sub-band processing circuit 110 can provide a wide variety of functions. For example, the sub-band processing circuit 110 can provide channel selection, spectrum stitching, calibration, and/or tuning operations.

Additional details of the wideband receiver 100 can be as described earlier.

Figure 2:
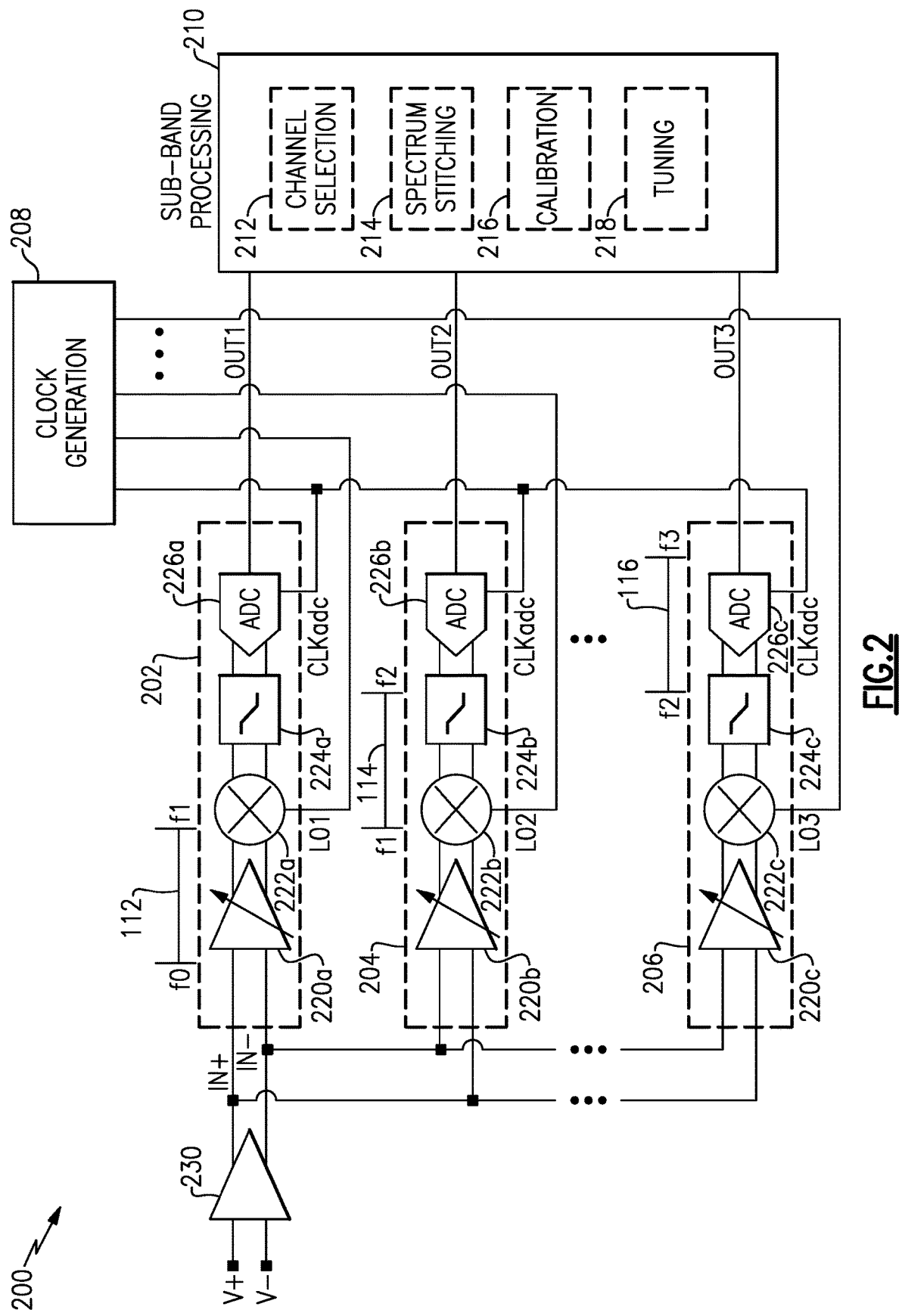
FIG. 2 is a schematic diagram of a wideband receiver according to another embodiment.

FIG. 2 is a schematic diagram of a wideband receiver 200 according to another embodiment. The wideband receiver 200 includes a differential amplifier 230, a first receiver slice 202, a second receiver slice 204, a third receiver slice 206, a clock generation circuit 208, and a sub-band processing circuit 210.

Although illustrated as including three receiver slices, the wideband receiver 200 can include more or fewer receiver slices. For example, the teachings herein are applicable to wideband receivers including two receiver slices, three receiver slices, or four or more receiver slices.

The differential amplifier 230 receives a differential RF input signal with a non-inverted signal component V+ and an inverted signal component V−, and generates an amplified differential RF input signal with a non-inverted signal component IN+ and an inverted signal component IN−. The differential RF input signal corresponds to a wideband RF signal. Although an embodiment using differential signaling is illustrated, the teachings herein are also applicable to singled-ended configurations, and to implementations using a combination of differential and single-ended signaling.

In the illustrated embodiment, the differential RF input signal has a full bandwidth that spans a frequency ranging from f0 to f3, and has been partitioned into the first sub-band 112, the second sub-band 114, and the third sub-band 116. The first, second, and third sub-bands 112, 114, and 116 are processed by the first, second, and third receiver slices 202, 204, and 206, respectively. Although the illustrated embodiment partitions the full bandwidth of the differential RF input signal into three sub-bands, an input signal's full bandwidth can be partitioned into more or fewer sub-bands. Additionally, although the sub-bands 112, 114, and 116 are illustrated as abutting in frequency, the sub-bands 112, 114, and 116 can also be selected to be partially overlapping.

In the illustrated embodiment, the clock generation circuit 208 provides a first local oscillator signal LO1 to the first receiver slice 202, a second local oscillator signal LO2 to the second receiver slice 204, and a third local oscillator signal LO3 to the third receiver slice 206. In addition, the clock generation circuit 208 provides an ADC clock signal CLKadc to the first, second, and third receiver slices 202, 204, and 206. Although the clock signals are illustrated as singled-ended, the teachings herein are also applicable to differential clock signals or implementations using a combination of single-ended and differential clock signals.

As shown in FIG. 2, the receiver slices 202, 204, and 206 are implemented as direct conversion circuits. The first receiver slice 202 includes a first variable gain amplifier (VGA) 220a, a first mixer 222a, a first low pass filter 224a, and a first analog-to-digital converter (ADC) 226a. The second receiver slice 204 includes a second VGA 220b, a second mixer 222b, a second low pass filter 224b, and a second ADC 226b. The third receiver slice 206 includes a third VGA 220c, a third mixer 222c, a third low pass filter 224c, and a third ADC 226c.

Although one example implementations of the receiver slices has been shown in FIG. 2, a wideband receiver can include receiver slices implemented in a wide variety of ways.

Each of the VGAs 220a-220c receives the amplified differential RF input signal generated by the differential amplifier 230. Additionally, an amplified signal generated by the first VGA 220a is provided to the first mixer 222a, which provides frequency down conversion using the first local oscillator signal LO1. The down-converted signal is filtered by the first low pass filter 224a, and the first ADC 226a generates the first digital output signal OUT1 by converting the filtered signal based on timing of the ADC clock signal CLKadc. Similarly, an amplified signal generated by the second VGA 220b is provided to the second mixer 222b, which provides frequency down conversion using the second local oscillator signal LO2. The down-converted signal is filtered by the second low pass filter 224b, and the second ADC 226b generates the second digital output signal OUT2 by converting the filtered signal based on timing of the ADC clock signal CLKadc. Likewise, an amplified signal generated by the third VGA 220c is provided to the third mixer 222c, which provides frequency down conversion using the third local oscillator signal LO3. The down-converted signal is filtered by the third low pass filter 224c, and the third ADC 226c generates the third digital output signal OUT3 by converting the filtered signal based on timing of the ADC clock signal CLKadc.

Although each of the mixers 222a-222c receives an amplifier version of the wideband input signal, the mixers 222a-222c operate using local oscillator signals of different frequencies. Accordingly, the mixers 222a-222c each down-convert sub-bands of different frequency to baseband.

For instance, in the first receiver slice 202, the first mixer 222a mixes the amplified signal from the first VGA 220a with the first local oscillator signal LO1 to down-shift the first sub-band 112 to baseband. Additionally, the first low pass filter 224a removes unwanted frequency components out of the desired band.

Similarly, in the second receiver slice 204, the second mixer 222b mixes the amplified signal from the second VGA 220b with the second local oscillator signal LO2 to down-shift the second sub-band 114 to baseband. Likewise, the third receiver slice 206 mixes the amplified signal from the third VGA 220c with the third local oscillator signal LO3 to down-shift the third sub-band 116 to baseband.

Accordingly, in the illustrated embodiment, the first, second, and third local oscillator signals LO1, LO2, and LO3 operate with different frequencies that are suitable to recover the first sub-band 112, the second sub-band 114, and the third sub-band 116, respectively. Accordingly, the first, second, and third digital output signals OUT1, OUT2, and OUT3 provide digital representations of signal content from the first sub-band 112, the second sub-band 114, and the third sub-band 116, respectively.

As shown in FIG. 2, analog-to-digital data conversion operations of the ADCs 226a-226c are controlled by timing of the ADC clock signal CLKadc. Since the filtered signals generated by the filters 224a-224c include sub-band frequency content rather than the full wideband signal content, the ADC clock signal CLKadc has a lower frequency relative to a direct sampling receiver that provides analog-to-digital conversion of a full wideband signal. Accordingly, the wideband receiver 200 exhibits superior power performance and can be implemented using lower speed ADCs of less cost.

Moreover, using a relatively low ADC sampling rate can relax constraints of the clock generation circuit 208, including, for instance, jitter specifications. This in turn reduces cost and complexity, and allows integration of the receiver slices 202, 204, and 206, the clock generation circuit 208, and the sub-band processing circuit 210 on a single integrated circuit or chip.

In one embodiment, the frequency of the ADC clock signal CLKadc is greater than the width of a sub-band by a factor of at least about 10. Implementing the ADC clock signal's frequency in this manner relaxes the filter requirement in front of the ADC.

The illustrated sub-band processing circuit 210 includes a channel selection circuit 212, a spectrum stitching circuit 214, a calibration circuit 216, and a tuning circuit 218. The sub-band processing circuit 210 processes the digital output signals OUT1, OUT2, and OUT3 generated by the receiver slices.

The channel selection circuit 212 can be used to digitally select one or more frequency channels from the signal content recovered from the wideband input signal. For example, the wideband input signal and/or the frequency sub-bands can include multiple frequency channels, and the channel selection circuit 212 can digitally filter the recovered signal content to generate a digital representation of the signal content in the selected frequency channel(s).

The spectrum stitching circuit 214 can be used to digitally combine signal content associated with multiple sub-bands. For example, when each of the receiver slices 202, 204, and 206 is enabled, recovered signal content of the first, second, and third sub-bands 112, 114, and 116 can be digitally stitched to reconstruct a digital representation of the wideband input signal. When only a portion of the receiver slices 202, 204, and 206 are enabled, the spectrum stitching circuit 214 can digitally reconstruct the signal content associated with the processed sub-bands. In one embodiment, the spectrum stitching circuit 214 operates with the channel selection circuit 212 to digitally reconstruct selected frequency channels associated with two or more sub-bands.

The calibration circuit 216 can be used to compensate for a wide variety of impairments of the wideband receiver 200. For example, the calibration circuit 216 can compensate for impairments arising from channel non-linearity, aliasing, and/or local oscillator leakage. Moreover, in implementations using quadrature receiver circuits, the calibration circuit 216 can be used to compensate for quadrature errors arising from gain and/or phase imbalances between I and Q paths of the receiver slices. Furthermore, in certain implementations, the calibration circuit 216 can be used to provide image rejection for each receiver slice.

The tuning circuit 218 can be used to tune analog components of the receiver slices. For example, in one embodiment, the tuning circuit 218 controls a corner frequency of an analog filter. The tuning circuit 218 can provide tuning in a wide variety of ways, including, but not limited to, generating a digital signal that digitally-controls a capacitance of an analog filter.

Although not illustrated in FIG. 2, enable signals can be provided to the receiver slices 202, 204, and 206 and/or clock generation circuit 208 to provide a configurable trade-off between bandwidth and power consumption. For example, when an enable signal associated with a particular receiver slice is in a disabled state, the VGA, mixer, filter, and/or ADC of the slice can be turned off, and/or the clock signal(s) provided to the slice can be disabled to conserve power and reduce heat dissipation.

Additional details of the wideband receiver 200 can be as described earlier.

Figure 3:
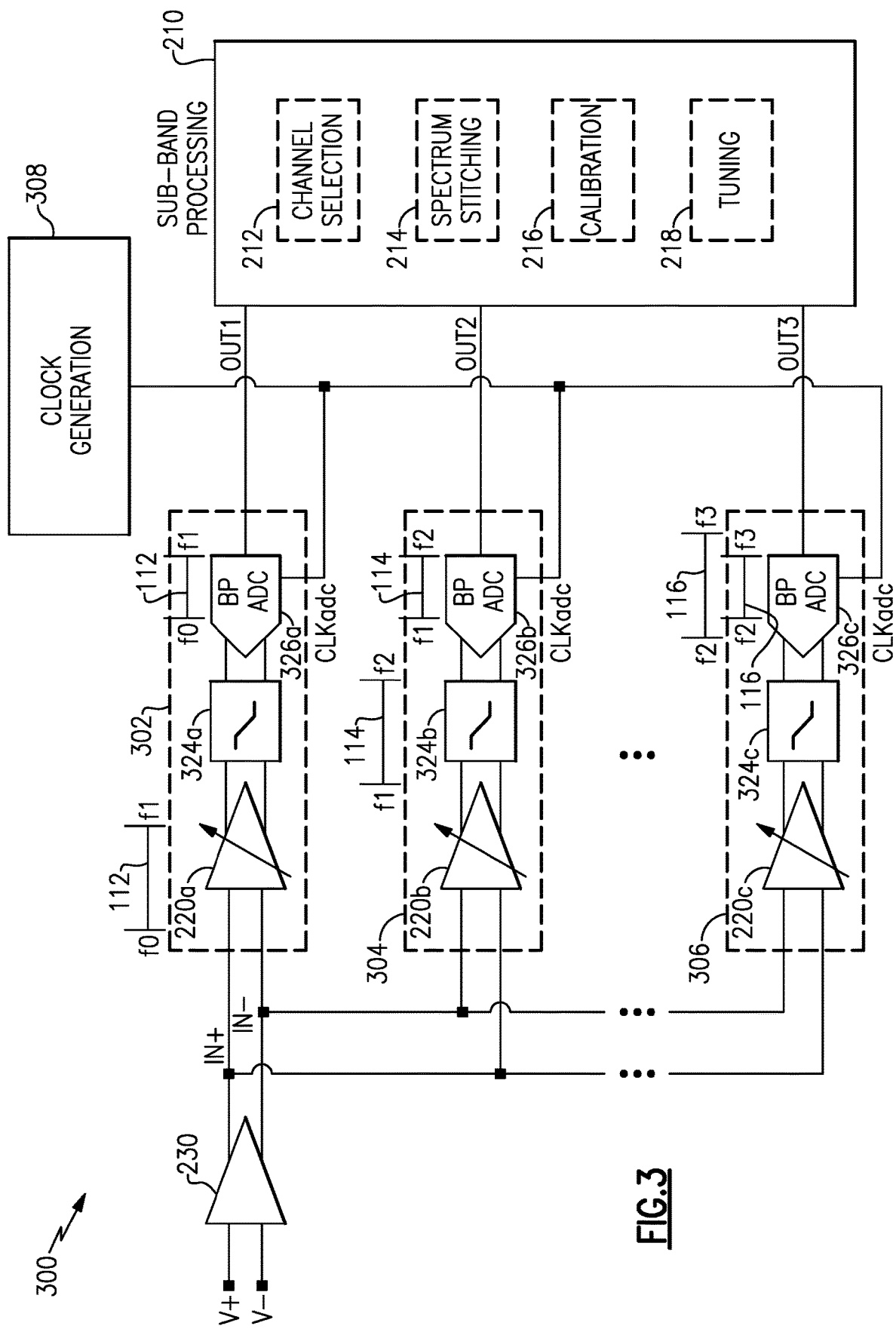
FIG. 3 is a schematic diagram of a wideband receiver according to another embodiment.

FIG. 3 is a schematic diagram of a wideband receiver 300 according to another embodiment. The wideband receiver 300 includes a differential amplifier 230, a first receiver slice 302, a second receiver slice 304, a third receiver slice 306, a clock generation circuit 308, and a sub-band processing circuit 210.

The wideband receiver 300 of FIG. 3 is similar to the wideband receiver 200 of FIG. 2 except that the wideband receiver 300 of FIG. 3 includes a different implementation of receiver slices and of a clock generation circuit.

For example, as shown in FIG. 3, the first receiver slice 302 includes a first VGA 220a, a first low pass filter 324a, and a first bandpass analog-to-digital converter (BP ADC) 326a. Additionally, the second receiver slice 304 includes a second VGA 220b, a second low pass filter 324b, and a second bandpass ADC 326b. Furthermore, the third receiver slice 306 includes a third VGA 220c, a third low pass filter 324c, and a third bandpass ADC 326c. As shown in FIG. 3, the clock generation circuit 308 generates an ADC clock signal CLKadc using to control data conversion operations of the bandpass ADCs 326a-326c.

The illustrated embodiment includes receiver slices implemented using bandpass ADCs that generate digital output signals representing signal information in a particular sub-band. For example, the first bandpass ADC 326a generates a first digital output signal OUT1 representing signal information in the first sub-band 112, the second bandpass ADC 326b generates a second digital output signal OUT2 representing signal information in the second sub-band 114, and the third bandpass ADC 326c generates a third digital output signal OUT3 representing signal information in the third sub-band 116. As persons having ordinary skill in the art will appreciate, a bandpass ADC digitizes a bandpass signal directly, without prior conversion to baseband.

Additional details of the wideband receiver 300 can be as described earlier.

Figure 4:
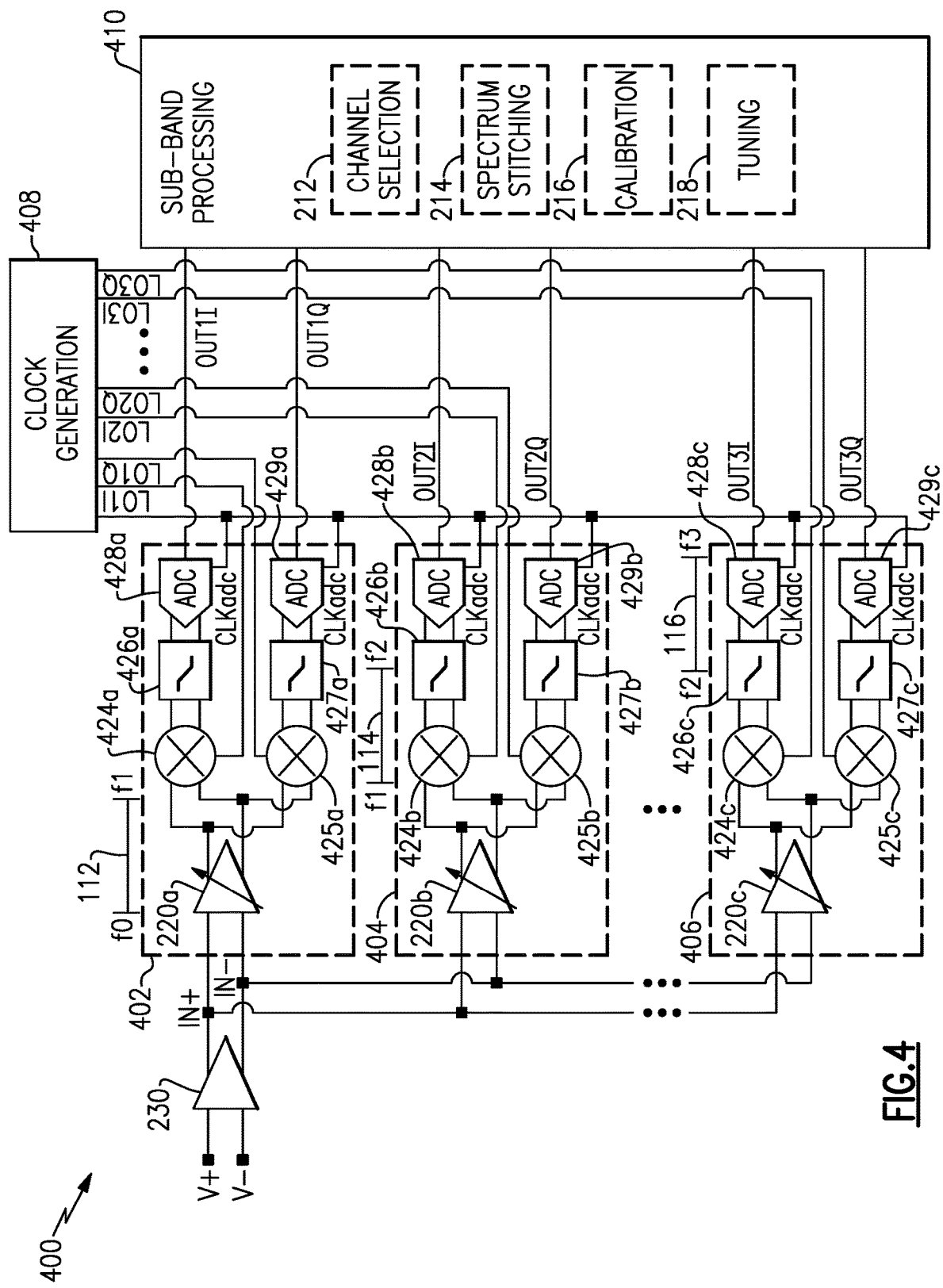
FIG. 4 is a schematic diagram of a wideband receiver according to another embodiment.

FIG. 4 is a schematic diagram of a wideband receiver 400 according to another embodiment. The wideband receiver 400 includes a differential amplifier 230, a first receiver slice 402, a second receiver slice 404, a third receiver slice 406, a clock generation circuit 408, and a sub-band processing circuit 410.

The wideband receiver 400 of FIG. 4 is similar to the wideband receiver 200 of FIG. 2, except that wideband receiver 400 is implemented using quadrature receiver circuits that separately process in-phase (I) and quadrature-phase (Q) components.

For example, the first receiver slice 402 includes a first VGA 220a, a first I-path mixer 424a, a first Q-path mixer 425a, a first I-path filter 426a, a first Q-path filter 427a, a first I-path ADC 428a, and a first Q-path ADC 429a. Additionally, the second receiver slice 404 includes a second VGA 220b, a second I-path mixer 424b, a second Q-path mixer 425b, a second I-path filter 426b, a second Q-path filter 427b, a second I-path ADC 428b, and a second Q-path ADC 429b. Furthermore, the third receiver slice 406 includes a third VGA 220c, a third I-path mixer 424c, a third Q-path mixer 425c, a third I-path filter 426c, a third Q-path filter 427c, a third I-path ADC 428c, and a third Q-path ADC 429c.

As shown in FIG. 2, the clock generation circuit 408 generates a first I local oscillator signal LOI1 and a first Q local oscillator signal LOQ1 for the first receiver slice 402. Additionally, the clock generation circuit 408 generates a second I local oscillator signal LOI2 and a second Q local oscillator signal LOQ2 for the second receiver slice 404. Furthermore, the clock generation circuit 408 generates a third I local oscillator signal LOI3 and a third Q local oscillator signal LOQ3 for the third receiver slice 406. A corresponding pair of I and Q local oscillator signals have substantially the same frequency and about a 90 degree difference in phase. However, different pairs of I and Q local oscillator signals have frequencies selected to down-shift a particular sub-band to baseband.

For example, the first receiver slice 402 generates a first digital I output signal OUT1I and a first digital Q output signal OUT1Q representing signal content in the first sub-band 112. Additionally, the second receiver slice 404 generates a second digital I output signal OUT2I and a second digital Q output signal OUT2Q representing signal content in the second sub-band 114. Furthermore, the third receiver slice 406 generates a third digital I output signal OUT3I and a third digital Q output signal OUT3Q representing signal content in the third sub-band 116. As shown in FIG. 4, the clock generation circuit 408 generates the ADC clock signal CLKadc, which is used to control timing of data conversion operations for generating the digital I and Q output signals.

The sub-band processing circuit 410 receives the digital I and Q output signals from the receiver slices 402, 404, and 406, and processes them in a manner similar to that described earlier with respect to the sub-band processing circuit 210 FIG. 2.

Additional details of the wideband receiver 400 can be as described earlier.

FIG. 5A is a schematic diagram 500a of sub-band bandwidth and LO frequencies for one implementation of a wideband receiver.

In the illustrated implementation, a wideband receive signal ranging between about 0.25 GHz and about 3.75 GHz has been partitioned into seven sub-bands, each of about 0.5 GHz in width. Additionally, in this particular example, the wideband receiver is implemented using seven receiver slices each operating using a different local oscillator frequency to process a particular one of the seven sub-bands.

In the illustrated example, the first receiver slice operates using a first local oscillator signal LO1 having a frequency of about 0.5 GHz, the second receiver slice operates using a second local oscillator signal LO2 having a frequency of about 1.0 GHz, the third receiver slice operates using a third local oscillator signal LO3 having a frequency of about 1.5 GHz, the fourth receiver slice operates using a fourth local oscillator signal LO4 having a frequency of about 2.0 GHz, the fifth receiver slice operates using a fifth local oscillator signal LO5 having a frequency of about 2.5 GHz, the sixth receiver slice operates using a sixth local oscillator signal LO6 having a frequency of about 3.0 GHz, and the seventh receiver slice operates using a seventh local oscillator signal LO7 having a frequency of about 3.5 GHz.

In the illustrated example, the full bandwidth of the receive signal is partitioned into non-overlapping sub-bands. However, the teachings herein are also applicable to configurations using partially overlapping sub-bands. In the illustrated example, a local oscillator frequency is selected to be in about a middle of a corresponding sub-band. By selecting the local oscillator frequency to be about in the middle of a sub-band, subsequent components in the signal path such as filters and ADCs can operate using about half of the total sub-band bandwidth. Thus, the bandwidth requirements of filters and/or ADCs can be relaxed relative to an implementation in which a local oscillator frequency is off-center.

Although FIG. 5A illustrates sub-band bandwidth and LO frequencies for one specific implementation of a wideband receiver, the wideband receivers herein can be implemented in a wide variety of ways. Additionally, a wideband receiver can process wideband input signals of a variety of frequencies and sub-band partitions.

FIG. 5B is a schematic diagram 500b of sub-band bandwidth and LO frequencies for another implementation of a wideband receiver.

In the illustrated implementation, a wideband receive signal ranging between about 0.25 GHz and about 3.75 GHz has been partitioned into six sub-bands, each of about 0.6 GHz in width. Additionally, in this particular example, the wideband receiver is implemented using six receiver slices each operating using a different local oscillator frequency to process a particular one of the six sub-bands.

In the illustrated example, the full bandwidth of the receive signal is partitioned into sub-bands that have a frequency overlap of about 50 MHz. Additionally, the first receiver slice operates using a first local oscillator signal LO1 having a frequency of about 0.55 GHz, the second receiver slice operates using a second local oscillator signal LO2 having a frequency of about 1.1 GHz, the third receiver slice operates using a third local oscillator signal LO3 having a frequency of about 1.65 GHz, the fourth receiver slice operates using a fourth local oscillator signal LO4 having a frequency of about 2.2 GHz, the fifth receiver slice operates using a fifth local oscillator signal LO5 having a frequency of about 2.75 GHz, and the sixth receiver slice operates using a sixth local oscillator signal LO6 having a frequency of about 3.3 GHz.

Although FIG. 5B illustrates sub-band bandwidth and LO frequencies for one specific implementation of a wideband receiver, the wideband receivers herein can be implemented in a wide variety of ways. Additionally, a wideband receiver can process wideband input signals of a variety of frequencies and sub-band partitions.

Figure 6A:
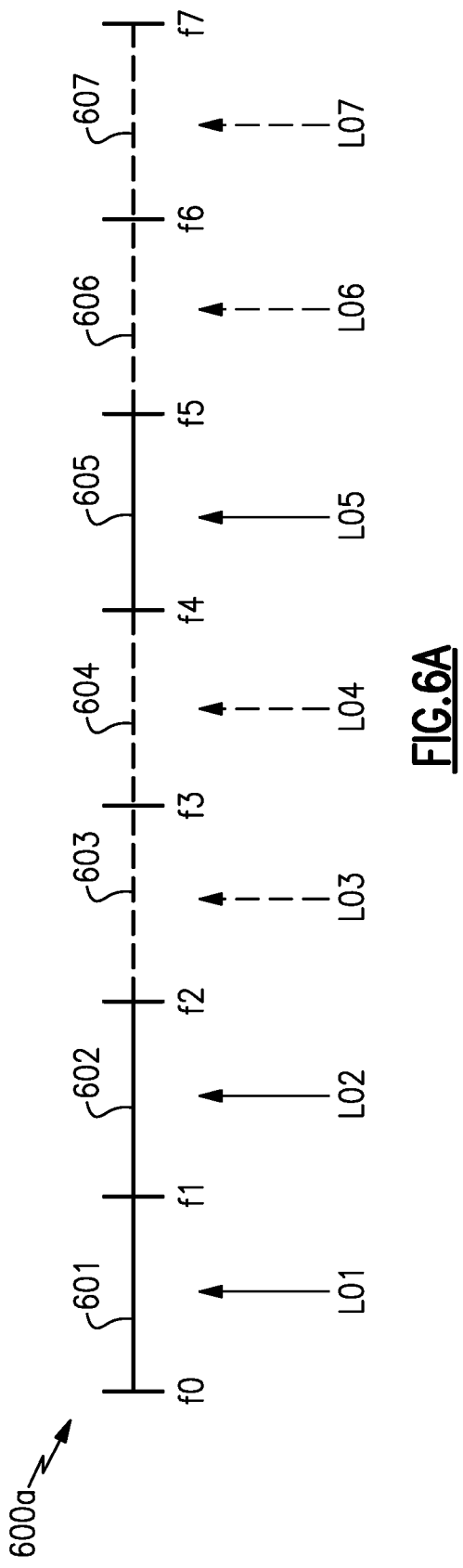
FIG. 6A is a schematic diagram of sub-band bandwidth and LO frequencies for one implementation of a wideband receiver with unused sub-bands turned off.

FIG. 6A is a schematic diagram 600*a* of sub-band bandwidth and LO frequencies for one implementation of a wideband receiver with unused sub-bands turned off.

In the illustrated example, a wideband receive signal ranging between frequency f0 and frequency f7 has been partitioned into first to seventh sub-bands 601-607, respectively. In this example, the first to seventh sub-bands 601-607 are separately processed using first to seventh receiver slices, respectively. The first to seventh receiver slices operate using first to seventh local oscillator signals LO1-LO7, respectively.

The diagram 600*a* schematically depicts an operating condition in which the wideband receiver is receiving data over sub-bands represented by solid lines and is not receiving data over sub-bands represented using dashed lines. In the illustrated example, the wideband receiver is processing the first sub-band 601, the second sub-band 602, and the fifth sub-band 605, but is not processing the third sub-band 603, the fourth sub-band 604, the sixth sub-band 606, and the seventh sub-band 607.

When operating over less than all sub-bands, a wideband receiver can disable receiver slices and/or local oscillator signals to conserve power. For example, in the illustrated example, local oscillators signals LO1, LO2, LO5 are enabled, and the local oscillator signals LO3, LO4, LO6, and LO7 are turned off to reduce power consumption.

Although one specific operation of sub-bands is shown, a wideband receiver can operate using any combination of sub-bands. Additionally, sub-bands and local oscillator frequencies can be selected in a variety of ways.

Figure 6B:
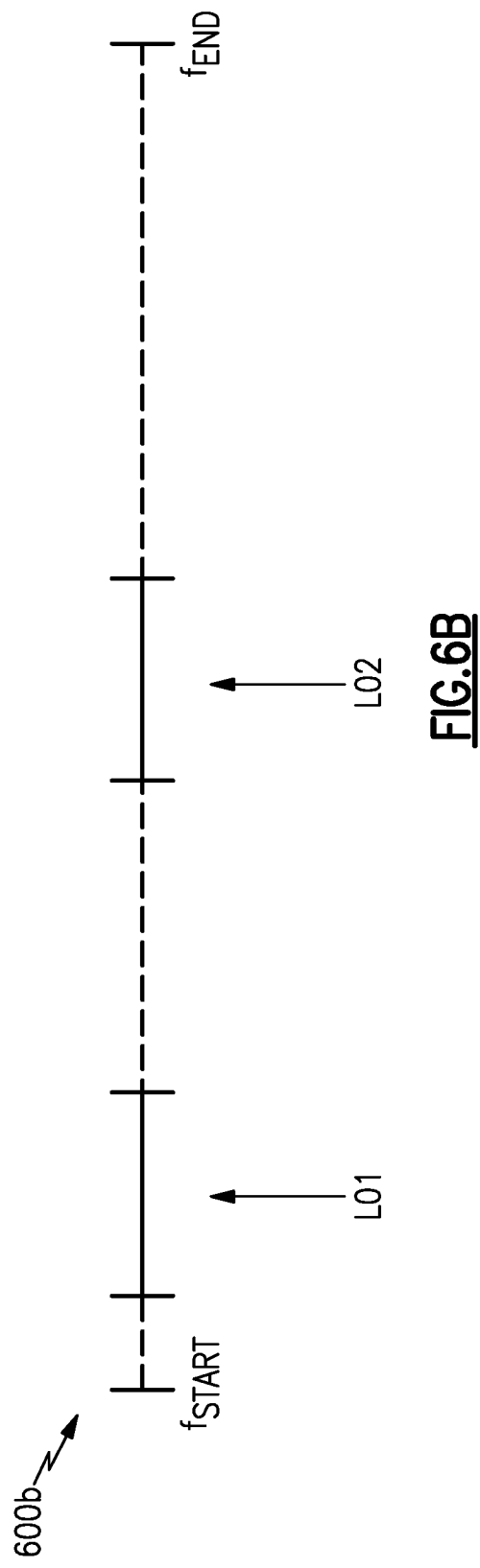
FIG. 6B is a schematic diagram of sub-band bandwidth and local oscillator LO frequencies for one implementation of a wideband receiver with adjustable sub-bands.

FIG. 6B is a schematic diagram 600*b* of sub-band bandwidth and local oscillator LO frequencies for one implementation of a wideband receiver with adjustable sub-bands. The wideband receiver includes one or more receiver slices that receive a variable frequency local oscillator signal from a clock generation circuit. The variable frequency local oscillator signal provided to a particular receiver slice can be set to allow the receiver slice to observe a particular sub-band.

As shown in FIG. 6B, the local oscillator signal LO1 can be used for a first receiver slice and the local oscillator signal LO2 can be used for a second receiver slice. By varying the frequencies of the local oscillator signals LO1 and LO2, the first and second receiver slices can be tuned to desired sub-bands within the input signal's full bandwidth from $f_{START}$ and $f_{END}$.

When concurrent digitization of all sub-bands is not desired, the clock generation circuit of a wideband receiver can use a phase locked loop (PLL) to generates a local oscillator signal that tunes an active receiver slice to a desired sub-band.

In one embodiment, a clock generation circuit includes at least a first PLL and a second PLL. Additionally, at least a first receiver slice operates using a first local oscillator signal generated by the first PLL, and at least a second receiver slice operates using a second local oscillator signal generated by the second PLL. When the second receiver slice and the second PLL are disabled, the first PLL controls the frequency of the first local oscillator signal such that the first receiver slice observes a desired portion of the total bandwidth. Implementing a wideband receiver in this manner allows arbitrary portions of total bandwidth to be received, even when one or more receiver slices are disabled.

Although one specific example with two tunable receiver slices is shown, other configurations are possible.

Figure 7:
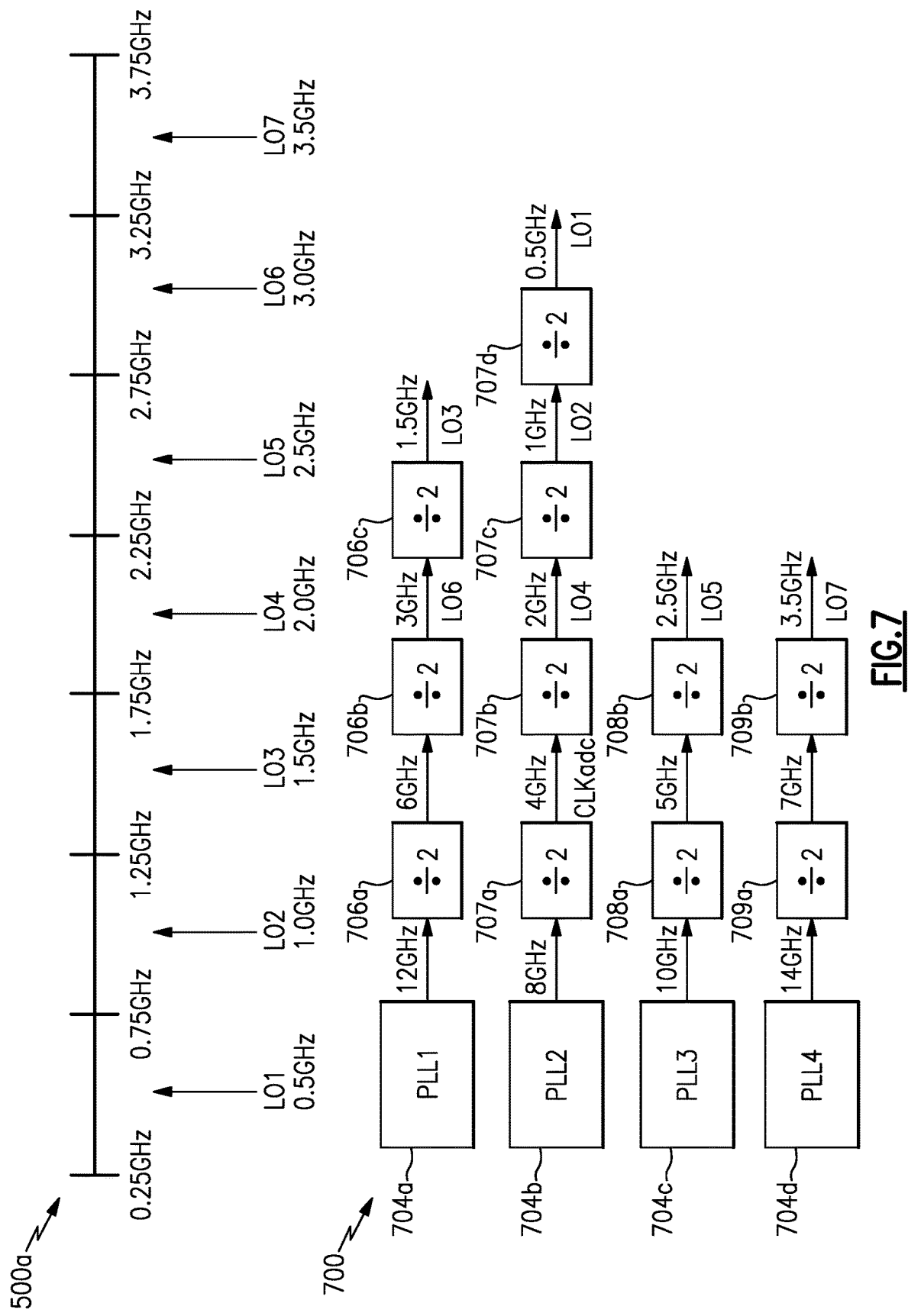
FIG. 7 is a schematic diagram of a clock generation circuit according to one embodiment.

FIG. 7 is a schematic diagram of a clock generation circuit 700 according to one embodiment. The clock generation circuit 700 illustrates one example of a clock generation circuit suitable for generating the LO frequencies discussed earlier with respect to FIG. 5A.

The illustrated clock generation circuit 700 includes a first PLL 704*a*, a second PLL 704*b*, a third PLL 704*c*, a fourth PLL 704*d*, a first group of integer dividers 706*a*-706*c*, a second group of integer dividers 707*a*-707*d*, a third group of integer dividers 708*a*-708*b*, and a fourth group of integer dividers 709*a*-709*b*.

The illustrated embodiment shows one example of a clock generation circuit that generates local oscillator signals using fewer PLLs than the number of receiver slices. Additionally, the illustrated embodiment generates local oscillator frequencies without the use of fractional dividers. Additionally, a common PLL is used to generate an ADC clock signal CLKadc and a portion of the local oscillator signals.

As shown in FIG. 7, the first PLL 704*a* and the first group of integer dividers 706*a*-706*c* generate the third and sixth local oscillator signals LO3, LO6. Additionally, the second PLL 704*b* and the second group of integer dividers 707*a*-707*d* generate the ADC clock signal CLKadc and the first, second, and fourth local oscillator signals LO1, LO2, and LO4. Furthermore, the third PLL 704*c* and the third group of integer dividers 708*a*-708*b* generates the fifth local oscillator signal LO5. Additionally, the fourth PLL 704*d* the fourth group of integer dividers 709*a*-709*b* the seventh local oscillator signal LO7. In the illustrated example, the integer dividers are divide-by-two dividers. However, other implementations are possible.

Although one specific implementation of a clock generation circuit is shown, a clock generation circuit can be implemented in a wide variety of was. For instance, a clock generation circuit can include more or fewer PLLs and/or integer dividers. Additionally, a clock generation circuit can include other components and/or a different arrangement of components.

In certain implementations, an input signal is processed using receiver slices that operate using local oscillator frequencies that are each a different integer multiple of a first local oscillator frequency. By selecting local oscillator signals that are integer multiples of a first local oscillator frequency, the clock signals can be generated using a common PLL and integer dividers. Thus, a group of receiver slices can have timing controlled by a group of PLLs of fewer number than the receiver slices. This, in turn, enhances integration, reduces power consumption, and lowers costs. Furthermore, such benefits can be further realized by generating an ADC clock signal used for data conversion using a common PLL used to generate local oscillator signals.

Additional details of the clock generation circuit 600 can be as described earlier.

Figure 8A:
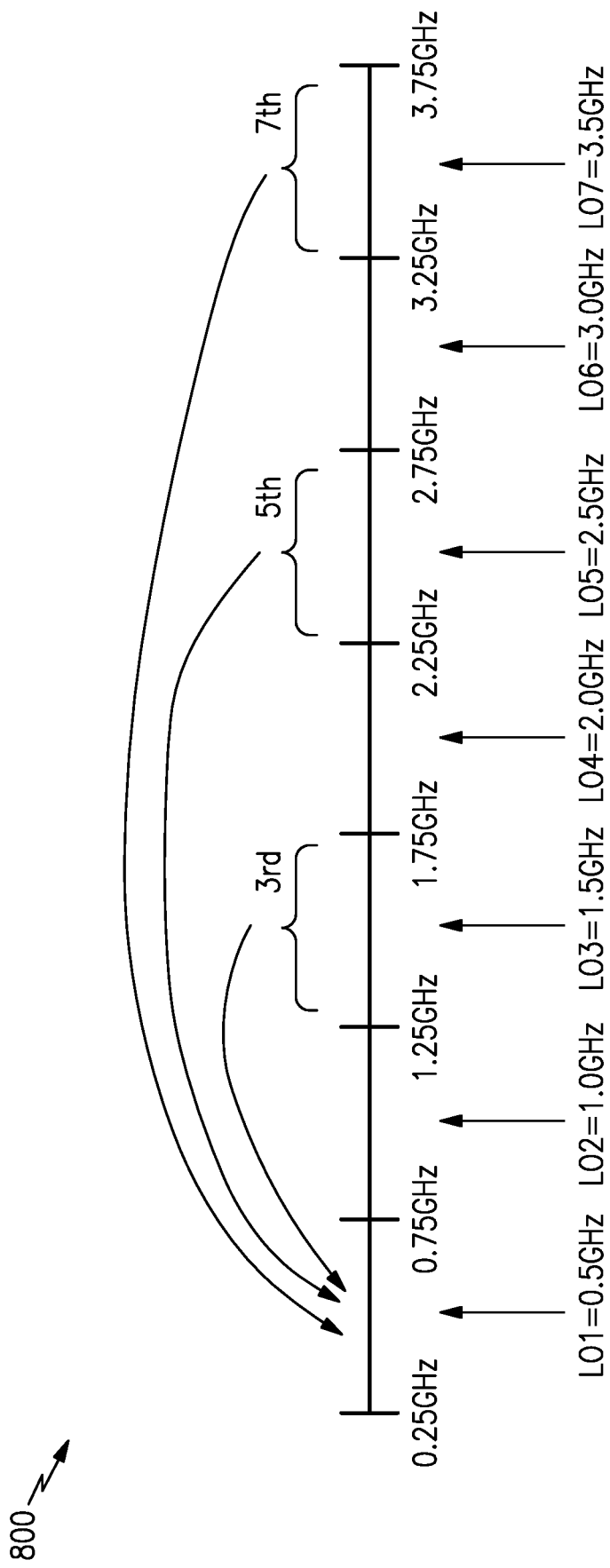
FIG. 8A is a schematic diagram of one example of harmonic folding for a wideband receiver.

FIG. 8A is a schematic diagram 800 of one example of harmonic folding for a wideband receiver. The illustrated example of harmonic folding is illustrated in the context of the sub-bands and LO frequencies discussed earlier with respect to FIG. 5A.

In a wideband receiver, harmonics of a mixer local oscillator can result in down-conversion of signal contents from higher frequency sub-bands to lower frequency sub-bands. In configurations including differential receiver slices, frequency fold-down is associated with odd harmonics.

For instance, as shown in FIG. 8A, a first receiver slice processes a first sub-band between 0.25 GHz-0.75 GHz, and operates using a first local oscillator frequency of about 0.5 GHz. However, third-order harmonic fold-down can result in signal content of the sub-band between 1.25 GHz-1.75 GHz folding into the first sub-band. Additionally, fifth-order harmonic fold-down can result in signal content of the sub-band between 2.25 GHz-2.75 GHz folding into the first sub-band. Furthermore, seventh-order harmonic fold-down can result in signal content of the sub-band between 3.25 GHz-3.75 GHz folding into the first sub-band. Absent compensation, the frequency folding can degrade signal quality at low frequencies.

Although the illustrated example shows third, fifth, and seventh order harmonic fold-down, harmonic fold-down can occur at other harmonics.

In certain implementations herein, a wideband receiver is implemented to compensate for frequency folding arising from local oscillator harmonics.

Figure 8B:
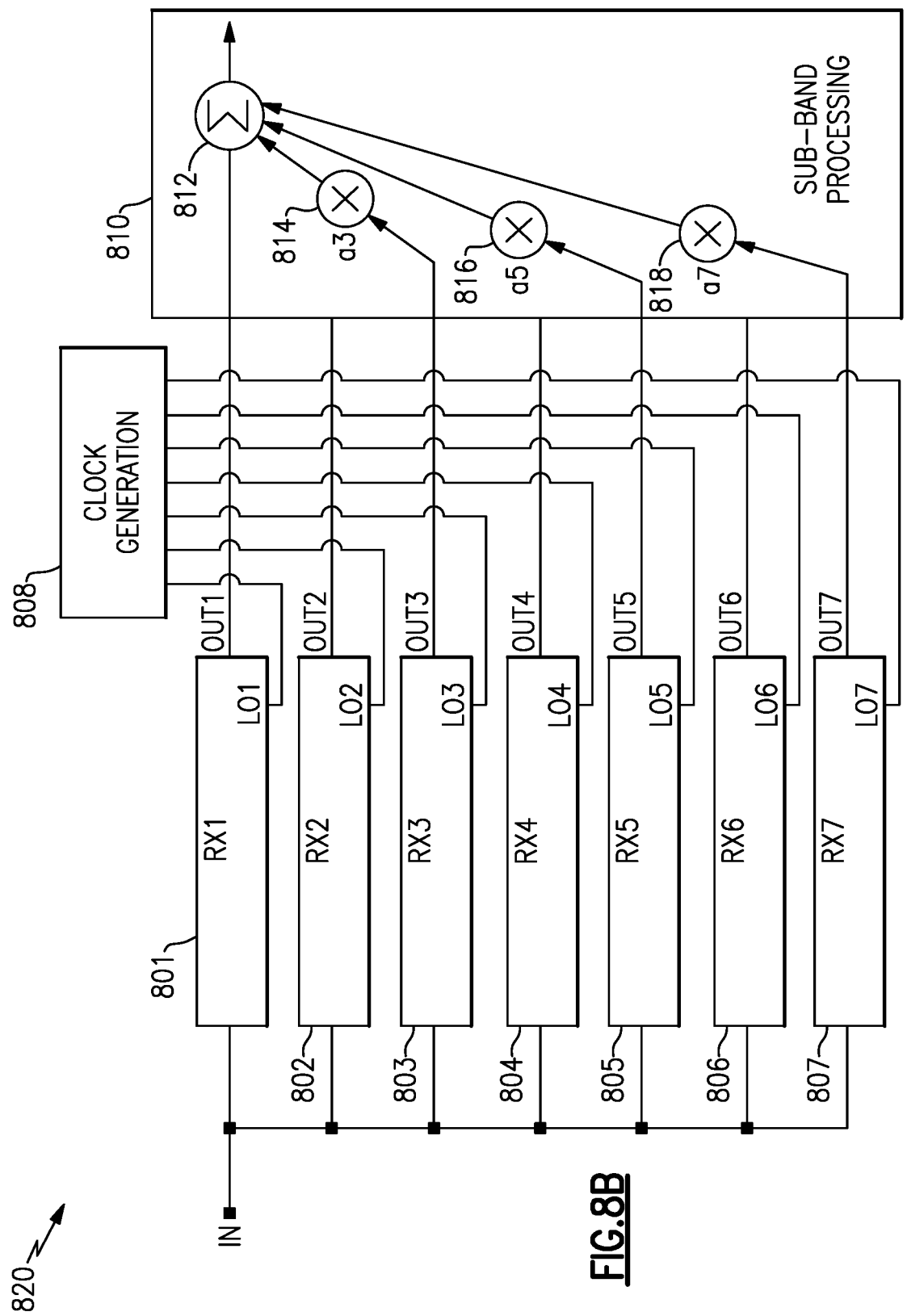
FIG. 8B is a schematic diagram of a wideband receiver according to another embodiment.

FIG. 8B is a schematic diagram of a wideband receiver 820 according to another embodiment. The wideband receiver 820 includes a first receiver slice 801, a second receiver slice 802, a third receiver slice 803, a fourth receiver slice 804, a fifth receiver slice 805, a sixth receiver slice 806, a seventh receiver slice 807, a clock generation circuit 808, and a sub-band processing circuit 810.

Although illustrated as including seven receiver slices, the wideband receiver 820 can include more or fewer receiver slices.

In the illustrated embodiment, the wideband input signal IN is provided to each of the receiver slices 801-807. The clock generation circuit 808 provides first to seventh local oscillator signals LO1-LO7 to the first through seventh receiver slices 801-807, respectively. The first to seventh digital signal outputs OUT1-OUT7 are generated by the first through seventh receiver slices 801-807, respectively, and are provided to the sub-band processing circuit 810 for processing. Each of the digital signal outputs OUT1-OUT7 represents signal content of a different sub-band of the wideband input signal IN.

In the illustrated embodiment, the second to seventh local oscillator signals LO2-LO7 are each different integer multiples of the first local oscillator signal LO1. For example, the LO2 can be about 2 times LO1, LO3 can be about 3 times LO1, LO4 can be about 4 times LO1, LO5 can be about 5 times LO1, LO6 can about 6 times LO1, and LO7 can be about 7 times LO1.

The sub-band processing circuit 810 is implemented to digitally compensate the first digital output signal OUT1 for third, fifth, and seventh order harmonic fold-down. For example, the sub-band processing circuit 810 includes an adder 812, a first multiplier 814, a second multiplier 816, and a third multiplier 818, which operate to digitally subtract weighted representations of signal content at odd harmonics of the first sub-band. In particular, the compensated output of the first receiver slice 801 corresponds to about OUT1−a3*OUT3−a5*OUT5−a7*OUT7.

The coefficients a3, a5, and a7 in the weighted subtraction can be determined in a variety of ways. For instance, the sub-band processing circuit 810 can be calibrated by applying a known input calibration signal (single tone or modulated tone) to the wideband receiver 820, and then processing the digital output signals from the receiver slices to determine weights of coefficients a3, a5, and a7 based on the expected received value in response to the input calibration signal. In one embodiment, the input calibration signal is generated on-chip using a signal generator.

Although the sub-band processing circuit 810 is illustrated as compensating only the first receiver slice 801 for harmonic fold-down, the sub-band processing circuit 810 can provide compensation to additional receiver slices.

Additional details of the wideband receiver 820 can be as described earlier.

Figure 8C:
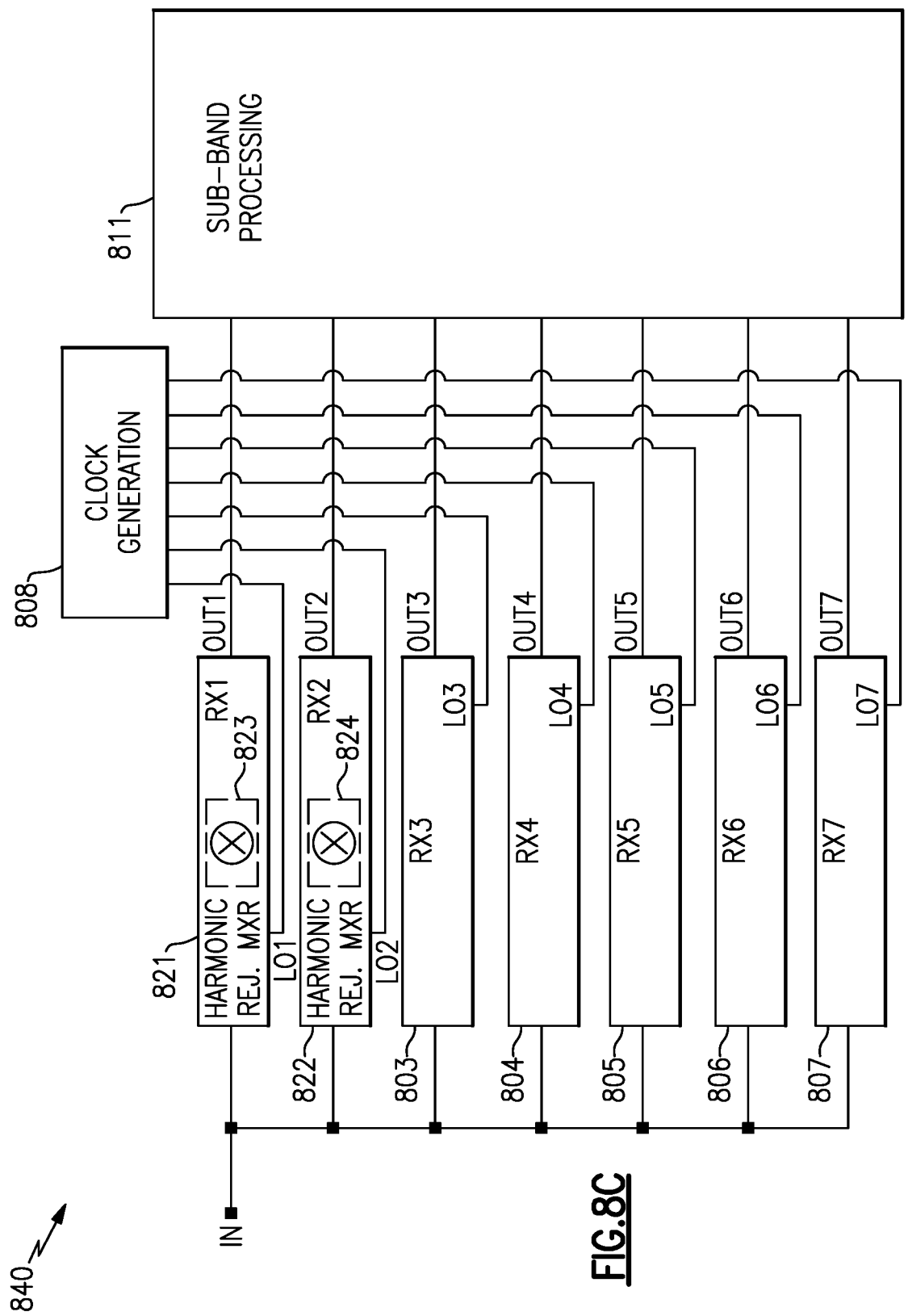
FIG. 8C is a schematic diagram of a wideband receiver according to another embodiment.

FIG. 8C is a schematic diagram of a wideband receiver 840 according to another embodiment. The wideband receiver 840 includes a first receiver slice 821, a second receiver slice 822, a third receiver slice 803, a fourth receiver slice 804, a fifth receiver slice 805, a sixth receiver slice 806, a seventh receiver slice 807, a clock generation circuit 808, and a sub-band processing circuit 811.

The wideband receiver 840 of FIG. 8C is similar to the wideband receiver 820 of FIG. 8B, except that the wideband receiver 840 of FIG. 8C includes a different implementation of harmonic fold-down compensation.

In particular, the wideband receiver 840 includes a first receiver slice 821 including a first harmonic rejection mixer 823 and a second receiver slice 822 including a second harmonic rejection mixer 824. The remaining receiver slices 803-807 are implemented without harmonic rejection mixers.

By including the first and second harmonic rejection mixers 823-824 in the first and second receiver slices 821-822, respectively, the wideband receiver 840 can exhibit excellent low frequency performance and high robustness to frequency fold-down.

Although the wideband receiver 800c shows only the first and second receiver slices 821 and 822 as using harmonic rejection mixers 823 and 824, other configurations are possible. In one example, a harmonic rejection mixer is used in only one receiver slice.

Figure 9:
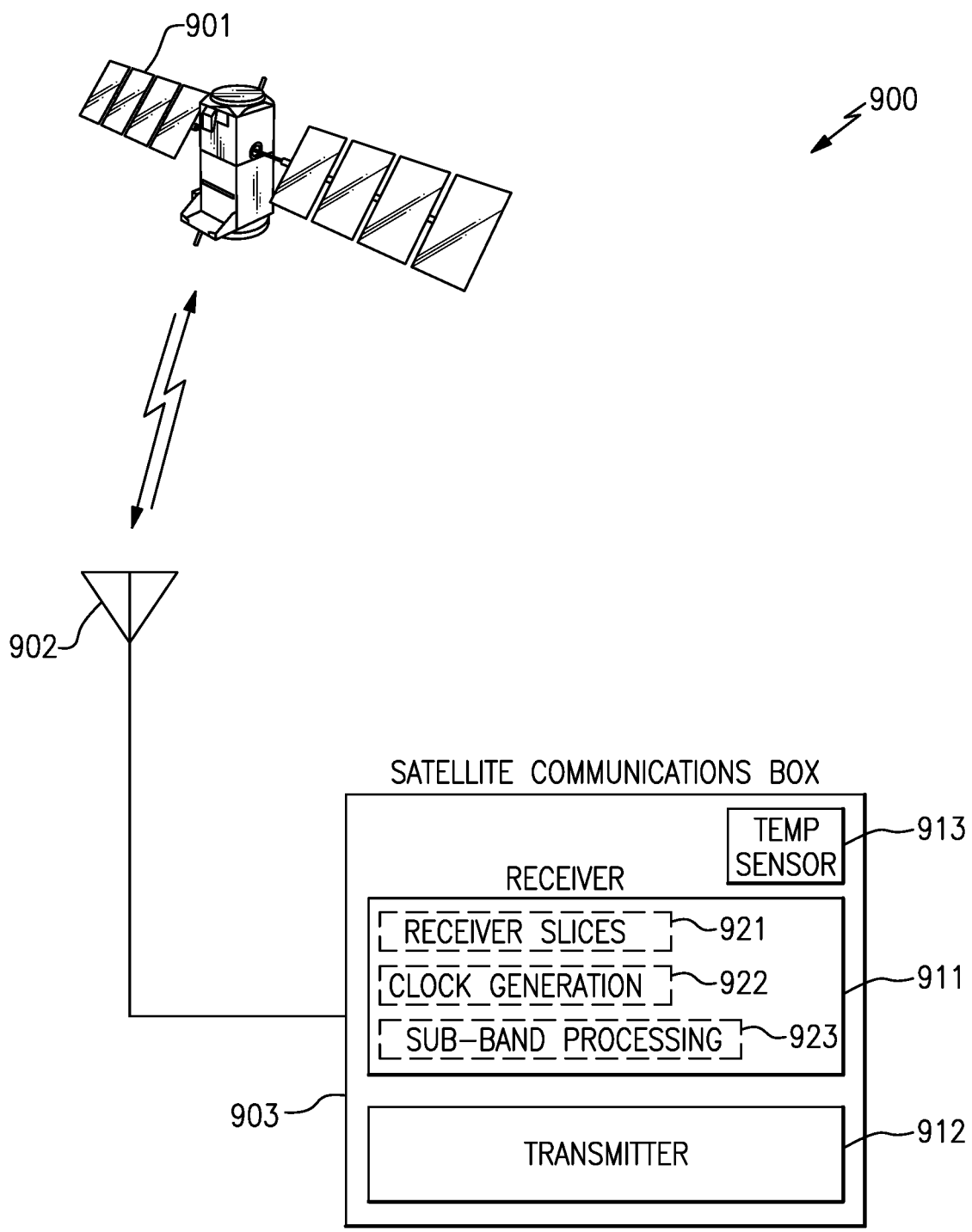
FIG. 9 is a schematic diagram of a broadband satellite communications system according to one embodiment.

FIG. 9 is a schematic diagram of a broadband satellite communications system 900 according to one embodiment. The broadband satellite communications system 900 includes a satellite 901, a ground antenna 902, and a satellite communications box 903. The satellite communications box 903 includes a wideband receiver 911, a transmitter 912, and a heat or temperature sensor 913.

The satellite communications box 903 receives a broadband signal from the satellite 901 via the antenna 902. The wideband receiver 911 includes multiple receiver slices 921 that each process a different sub-band of the broadband signal. The wideband receiver 911 further includes a clock generation circuit 922 that generates clock signals that control timing of the receiver slices 921, and a sub-band processing circuit 923 that processes digital output signals generated by the receiver slices 921. Additional details of the wideband receiver 911 can be similar to those described earlier.

The illustrated wideband receiver 911 provides a configurable trade-off between bandwidth and power consumption. In one embodiment, the operating bandwidth of the wideband receiver 911 is controlled at least in part based on a detected temperature by the temperature sensor 913. For example, the wideband receiver 911 can be implemented to reduce reception bandwidth when the detected temperature is relatively high. By reducing reception bandwidth in this manner, the power consumption and heat dissipation of the wideband receiver 911 can be reduced to avoid overheating the satellite communications box 903.

Configuring the satellite communications box 903 in this manner reduces or eliminates interruption of a communication link between the satellite 901 and the box 903 during extended operating conditions associated with high levels of heat dissipation. In contrast, conventional satellite communication boxes can have a transmitter and/or receiver that shuts-off when a certain amount of temperature is detected. Shutting off a transmitter and/or receiver breaks the communication link and can lead to a loss of service.

Although the broadband satellite communications system 900 illustrates one example of a communication system that can include a wideband receiver, the wideband receivers described herein can be used in a wide variety of applications.

Applications

Devices employing the above described wideband receivers can be implemented into various electronic devices. Examples of the electronic devices can include, but are not limited to, consumer electronic products, parts of the consumer electronic products, electronic test equipment, etc. Examples of the electronic devices can also include circuits of optical networks or other communication networks. The consumer electronic products can include, but are not limited to, an automobile, a camcorder, a camera, a digital camera, a portable memory chip, a washer, a dryer, a washer/dryer, a copier, a facsimile machine, a scanner, a multifunctional peripheral device, etc. Further, the electronic device can include unfinished products, including those for industrial, medical and automotive applications.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A radio frequency (RF) communication system comprising:
   two or more receiver slices configured to operate in parallel with one another to process an RF input signal having a bandwidth comprising a first sub-band and a second sub-band, wherein the two or more receiver slices comprise:
      a first receiver slice configured to down-convert the RF input signal having the bandwidth, and to process the first sub-band of the RF input signal and to generate a first digital signal representing the first sub-band; and
      a second receiver slice configured to down-convert the RF input signal having the bandwidth, and to process the second sub-band of the RF input signal and to generate a second digital signal representing the second sub-band, wherein the first sub-band and the second sub-band are at least partially non-overlapping in frequency;
   a clock generation circuit configured to generate one or more clock signals configured to control timing of the two or more receiver slices; and
   a sub-band processing circuit configured to process a plurality of digital signals generated by the two or more receiver slices, wherein the plurality of digital signals comprise the first digital signal and the second digital signal, and wherein the sub-band processing circuit is configured to compensate for harmonic folding based at least in part on adding the first digital signal from the first receiver slice to the second digital signal from the second receiver slice.

2. The RF communication system of claim 1, wherein the two or more receiver slices comprises at least three receiver slices.

3. The RF communication system of claim 1, wherein the two or more receiver slices are individually enablable to provide a configurable bandwidth versus power consumption profile.

4. The RF communication system of claim 1, wherein the one or more clock signals comprises a first local oscillator signal and a second local oscillator signal, wherein the first receiver slice comprises a first mixer configured to down-convert the RF input signal with the first local oscillator signal, and wherein the second receiver slice comprises a second mixer configured to down-convert the RF input signal with the second local oscillator signal.

5. The RF communication system of claim 1, wherein:
   the sub-band processing circuit is configured to compensate the first digital signal for the harmonic folding based at least in part on adding the first digital signal from the first receiver slice to a weighted representation of the second digital signal from the second receiver slice;
   the weighted representation has a negative weighting; and
   the second digital signal includes an odd harmonic of the first digital signal.

6. The RF communication system of claim 1, wherein the one or more clock signals comprise a plurality of local oscillator signals that control down-conversion operations of the two or more receiver slices, wherein the clock generation circuit comprises a phase-locked loop (PLL) and one or more integer dividers configured to generate the plurality of local oscillator signals.

7. The RF communication system of claim 1, wherein the two or more receiver slices are each implemented as a quadrature receiver circuit that separately processes in-phase (I) and quadrature-phase (Q) components of the RF input signal.

8. The RF communication system of claim 1, wherein the sub-band processing circuit comprises a spectrum stitching circuit configured to digitally reconstruct at least a portion of the RF input signal based on processing the plurality of digital signals.

9. The RF communication system of claim 1, wherein the sub-band processing circuit comprises a channel selector configured to digitally select one or more frequency channels from among a plurality of frequency channels within the bandwidth and to digitally filter recovered signal content to generate a digital representation of the signal content in the selected one or more frequency channels.

10. The RF communication system of claim 1, wherein the first receiver slice comprises a first bandpass analog-to-digital converter (ADC) that processes the first sub-band and wherein the second receiver slice comprises a second bandpass ADC that processes the second sub-band, wherein one or more clock signals comprises an ADC clock signal that controls timing of conversion operations of the first and second bandpass ADCs.

11. The RF communication system of claim 1, wherein the first receiver slice is configured to down-convert the RF input signal having the bandwidth prior to filtering, and wherein the second receiver slice configured to down-convert the RF input signal of the bandwidth prior to filtering.

12. The RF communication system of claim 4, wherein an odd harmonic of the first local oscillator signal down-converts at least a portion of the second sub-band into the first sub-band.

13. The RF communication system of claim 4, wherein the first mixer comprises a harmonic rejection mixer that inhibits harmonic folding.

14. The RF communication system of claim 6, wherein the one or more clock signals further comprises an analog-to-digital clock signal configured to control timing of data conversion operations of the two or more receiver slices, wherein the PLL and the one or more integer dividers are further configured to generate the analog-to-digital clock signal.

15. A method of radio frequency communication, the method comprising:
receiving an RF input signal as an input to a receiver that comprises two or more receiver slices, wherein the RF input signal has a bandwidth that comprises a plurality of sub-bands;
down-converting the RF input signal having the bandwidth using each of the two or more receiver slices;
processing a different one of the plurality of sub-bands using each of the two or more receiver slices;
generating a plurality of digital signals representing the plurality of sub-bands using the two or more receiver slices;
generating one or more clock signals that control timing of the two or more receiver slices using a clock generation circuit of the receiver;
compensating at least one of the plurality of digital signals for harmonic folding, wherein the compensating comprises adding weighted representations of at least two of the digital signals; and
processing the plurality of digital signals using a sub-band processing circuit of the receiver.

16. The method of claim 15, wherein generating the one or more clock signals comprises generating a plurality of local oscillator signals of different frequencies.

17. The method of claim 15, further comprising controlling a number of enabled receiver slices of the two or more receiver slices over time to control a bandwidth versus power consumption profile of the receiver.

18. A satellite communications box comprising:
a temperature sensor configured to detect a temperature of the satellite communications box; and
a wideband receiver comprising:
two or more receiver slices configured to operate in parallel with one another to process an RF input signal received from a satellite, wherein the two or more receiver slices are configured to down-convert the RF input signal having a bandwidth comprising a plurality of sub-bands and to generate a plurality of digital signals representing the plurality of sub-bands of the RF input signal;
a clock generation circuit configured to generate one or more clock signals that control timing of the two or more receiver slices; and
a sub-band processing circuit configured to process the plurality of digital signals generated by the two or more receiver slices, the sub-band processing circuit further configured to compensate for harmonic folding in one or more of the plurality of digital signals based at least in part on digitally adding weighted digital signals from at least two of the two or more receiver slices; and
wherein the two or more receiver slices are individually enablable, wherein a number of enabled receiver slices of the two or more receiver slices is based on the detected temperature.

19. The satellite communications box of claim 18, wherein the one or more clock signals comprises at least three local oscillator signals configured to control down-conversion in at least three receiver slices, wherein the clock generation circuit comprises a shared PLL configured to generate two or more of the at least three local oscillator signals.

20. The satellite communications box of claim 18, wherein the two or more receiver slices each comprise a mixer configured to provide down-conversion to the RF input signal.

* * * * *

UNITED STATES PATENT AND TRADEMARK OFFICE
CERTIFICATE OF CORRECTION

| | |
|---|---|
| PATENT NO. | : 11,064,446 B2 |
| APPLICATION NO. | : 15/139212 |
| DATED | : July 13, 2021 |
| INVENTOR(S) | : Saeed Aghtar |

It is certified that error appears in the above-identified patent and that said Letters Patent is hereby corrected as shown below:

On the Title Page

Column 1, Item (73), Line 1, under Assignee, delete "Anatog" and insert --Analog--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*